United States Patent
Dahod et al.

(10) Patent No.: US 10,013,429 B2
(45) Date of Patent: Jul. 3, 2018

(54) COMPUTER-IMPLEMENTED METHODS AND SYSTEMS FOR FACILITATING BUSINESS-TO-BUSINESS TRANSACTIONS ON A COLLABORATIVE BUSINESS NETWORK AND FOR SYSTEM INTEGRATION MESSAGE ROUTING AND IDENTIFIER MAPPING UTILIZING A SHARED WORKSPACE MECHANISM

(71) Applicant: TraceLink, Inc., Woburn, MA (US)

(72) Inventors: Shabbir M. Dahod, Andover, MA (US); Peter J. Spellman, Quincy, MA (US); Lucia Deus, Reading, MA (US); Christopher Cebelenski, Arlington, MA (US); Stefan Baytarian, Acton, MA (US)

(73) Assignee: TRACELINK, INC., Wakefield, MA (US)

( * ) Notice: Subject to any disclaimer, the term of this patent is extended or adjusted under 35 U.S.C. 154(b) by 56 days.

(21) Appl. No.: 13/853,906

(22) Filed: Mar. 29, 2013

(65) Prior Publication Data

US 2013/0262372 A1  Oct. 3, 2013

Related U.S. Application Data

(60) Provisional application No. 61/617,381, filed on Mar. 29, 2012.

(51) Int. Cl.
*G06F 17/30* (2006.01)
*G06Q 10/10* (2012.01)

(52) U.S. Cl.
CPC .. *G06F 17/30179* (2013.01); *G06F 17/30569* (2013.01); *G06Q 10/10* (2013.01)

(58) Field of Classification Search
CPC ........ G06F 17/30179; G06F 17/30569; G06Q 10/10
USPC .......................................................... 707/607
See application file for complete search history.

(56) References Cited

U.S. PATENT DOCUMENTS

| | | | |
|---|---|---|---|
| 5,535,375 A * | 7/1996 | Eshel et al. ...................... 703/27 |
| 5,671,407 A | 9/1997 | Demers et al. | |
| 6,085,199 A * | 7/2000 | Rose ............................. 707/823 |
| 6,157,915 A | 12/2000 | Bhaskaran et al. | |
| 6,505,200 B1 * | 1/2003 | Ims et al. ...................... 707/638 |
| 6,823,340 B1 | 11/2004 | Clark | |
| 6,961,760 B2 | 11/2005 | Li et al. | |
| 6,986,104 B2 | 1/2006 | Green et al. | |
| 7,035,817 B1 * | 4/2006 | Brothers ............ G06Q 30/0641 705/27.1 |
| 7,085,286 B2 | 8/2006 | Dias et al. | |

(Continued)

FOREIGN PATENT DOCUMENTS

KR   2010-0026953 A   3/2010

OTHER PUBLICATIONS

Marmel Elaine, Miocrosoft Office Project 2007 Bible, ISBN 0470009926, Wiley Publishing 2007.

(Continued)

*Primary Examiner* — Jared M Bibbee
(74) *Attorney, Agent, or Firm* — Steven M. Greenberg, Esq.; CRGO Law

(57) ABSTRACT

A computer-implemented method for facilitating business-to-business transactions on a collaborative business network among a plurality of entities.

20 Claims, 8 Drawing Sheets

(56) References Cited

U.S. PATENT DOCUMENTS

| | | |
|---|---|---|
| 7,120,703 B2 | 10/2006 | Li et al. |
| 7,143,190 B2 | 11/2006 | Christensen et al. |
| 7,155,455 B2 | 12/2006 | Clendenin |
| 7,236,939 B2 | 6/2007 | Chen et al. |
| 7,249,157 B2 | 7/2007 | Stewart et al. |
| 7,281,211 B2 | 10/2007 | Jeannette et al. |
| 7,386,797 B1 | 6/2008 | Chatterjee et al. |
| 7,571,166 B1 | 8/2009 | Davies et al. |
| 7,574,441 B2 | 8/2009 | Clark |
| 7,680,867 B2 | 3/2010 | Green et al. |
| 7,797,452 B2 | 9/2010 | Christensen et al. |
| 7,865,358 B2 | 1/2011 | Green et al. |
| 7,925,675 B2 | 4/2011 | Stark et al. |
| 7,970,826 B2 | 6/2011 | Kuno et al. |
| 7,987,116 B2 | 7/2011 | Vasconi et al. |
| 8,020,196 B2 | 9/2011 | Randle et al. |
| 8,028,229 B2 | 9/2011 | Bailor et al. |
| 8,095,497 B2* | 1/2012 | O'Brien et al. ............ 707/769 |
| 8,280,755 B2* | 10/2012 | Stuhec et al. ............. 705/7.11 |
| 8,321,438 B1* | 11/2012 | Smith et al. .............. 707/758 |
| 2002/0010741 A1 | 1/2002 | Stewart et al. |
| 2002/0069196 A1* | 6/2002 | Betros et al. ................ 707/7 |
| 2003/0046134 A1 | 3/2003 | Frolick et al. |
| 2004/0186842 A1* | 9/2004 | Wesemann ................ 707/100 |
| 2004/0236639 A1* | 11/2004 | Candadai ............. G06Q 10/10 705/26.1 |
| 2005/0065903 A1* | 3/2005 | Zhang et al. .................. 707/1 |
| 2005/0120039 A1* | 6/2005 | Amys et al. ................ 707/102 |
| 2006/0085796 A1 | 4/2006 | Hoerle et al. |
| 2006/0085799 A1 | 4/2006 | Hoerle et al. |
| 2006/0106473 A1* | 5/2006 | Enright et al. ................ 700/96 |
| 2006/0253860 A1 | 11/2006 | Hoerle et al. |
| 2007/0005613 A1* | 1/2007 | Singh ................... G06Q 20/40 |
| 2007/0005774 A1* | 1/2007 | Singh ................ H04L 63/0263 709/227 |
| 2007/0011459 A1* | 1/2007 | Stapleton ............ G06Q 20/382 713/178 |
| 2008/0005235 A1 | 1/2008 | Hegde et al. |
| 2008/0312978 A1 | 12/2008 | Binney et al. |
| 2009/0024514 A1* | 1/2009 | Kumaran et al. ............. 705/37 |
| 2010/0088676 A1 | 4/2010 | Yuan et al. |
| 2012/0109988 A1* | 5/2012 | Li et al. ..................... 707/756 |
| 2012/0259793 A1* | 10/2012 | Umansky et al. ........... 705/348 |
| 2013/0332564 A1* | 12/2013 | Jones .................. G06Q 10/101 709/217 |

OTHER PUBLICATIONS

Hampel Thorsten, Access Rights—The Keys to Cooperative Work Learning, Lectures Notes in Computer Science v 3511, 119-130, Springer, 2005 teaching a collaborative business environment system http://www.springerlink.com/content!c8jmpadev7wyl086/.

* cited by examiner

| Business Process | Transaction | Delivery Options | Transaction Cross-Reference | Customer and Supplier ID Override | Movement Type Code |
|---|---|---|---|---|---|
| All | | | | | |
| Inventory Monitoring | Inventory Report | Manual Delivery only | ☒ Enable Customer Lot Number | ☒ Enable | |
| Material Tracking | Material PO | Manual Delivery only | | | |
| Material Tracking | Material PO Confirmation | Manual Delivery only | | | |
| Production Tracking | Materials Consumed | Deliver after business user review | ☒ Enable Customer Lot Number | ☒ Enable | 543 |
| Production Tracking | Materials Consumed Reversal | Deliver after business user review | ☒ Enable Customer Lot Number | ☒ Enable | 544 |
| Production Tracking | Materials Issued | Deliver after business user review | ☒ Enable Customer Lot Number | ☒ Enable | 541 |
| Production Tracking | Materials Issued Reversal | Deliver after business user review | ☒ Enable Customer Lot Number | ☒ Enable | 542 |
| Production Tracking | Materials Produced | Deliver after business user review | ☐ Enable Customer Lot Number | ☒ Enable | 101 |
| Production Tracking | Materials Produced Reversal | Deliver after business user review | ☐ Enable Customer Lot Number | ☒ Enable | 102 |

COMPUTER-IMPLEMENTED METHODS AND SYSTEMS FOR FACILITATING BUSINESS-TO-BUSINESS TRANSACTIONS ON A COLLABORATIVE BUSINESS NETWORK AND FOR SYSTEM INTEGRATION MESSAGE ROUTING AND IDENTIFIER MAPPING UTILIZING A SHARED WORKSPACE MECHANISM

CROSS REFERENCE TO RELATED APPLICATION

This application claims priority from U.S. Provisional Patent Application No. 61/617,381 filed on Mar. 29, 2013 entitled COMPUTER-IMPLEMENTED METHODS AND SYSTEMS FOR FACILITATING BUSINESS-TO-BUSINESS TRANSACTIONS ON A COLLABORATIVE BUSINESS NETWORK AND FOR SYSTEM INTEGRATION MESSAGE ROUTING AND IDENTIFIER MAPPING UTILIZING A SHARED WORKSPACE MECHANISM, which is hereby incorporated by reference.

BACKGROUND

Businesses implement information systems for managing their enterprise business processes, which are often incompatible for exchanging transactions with other businesses. For many business-to-business relationships, it is necessary to exchange electronic transactions that can be transmitted from one business system and integrated into another business system. Current techniques of using portals and standardized file formats involve significant initial costs, time spent, and on-going costs as each business system changes its formats and methods of transmission.

BRIEF SUMMARY OF THE DISCLOSURE

A computer-implemented method in accordance with one or more embodiments is provided for facilitating business-to-business transactions on a collaborative business network among a plurality of entities. The method comprises the steps, performed by a computer system, of: (a) maintaining a directory specifying a file format for transactions received from and to be sent to each of said entities in a business process shared with another one or more of said entities; (b) receiving a transaction from a first one of said entities directed to a second one of said entities, said transaction having a file format associated with said first entity; (c) translating the transaction received in (b) from the file format associated with first entity to a transaction having a canonical file format; (d) transmitting the transaction in the canonical file format to a collaborative workspace shared by the first and second entities; (e) translating the transaction in the canonical file format to a transaction in a file format specified in the directory for files to be sent to the second entity; and (f) transmitting the transaction translated in (f) to the second entity.

In accordance with one or more further embodiments, a computer system is provided for facilitating business-to-business transactions on a collaborative business network among a plurality of entities. The computer system comprise at least one processor, memory associated with the at least one processor, and a program supported in the memory. The program has a plurality of instructions stored therein which, when executed by the at least one processor, cause the at least one processor to: (a) maintain a directory specifying a file format for transactions received from and to be sent to each of said entities in a business process shared with another one or more of said entities; (b) receive a transaction from a first one of said entities directed to a second one of said entities, said transaction having a file format associated with said first entity; (c) translate the transaction received in (b) from the file format associated with first entity to a transaction having a canonical file format; (d) transmit the transaction in the canonical file format to a collaborative workspace shared by the first and second entities; (e) translate the transaction in the canonical file format to a transaction in a file format specified in the directory for files to be sent to the second entity; and (f) transmit the transaction translated in (f) to the second entity.

BRIEF DESCRIPTION OF THE DRAWINGS

FIGS. 2-4 and 6-8 are screenshots illustrating an exemplary user interface for use of a transaction processing system in accordance with one or more embodiments.

DETAILED DESCRIPTION

Figure 1:
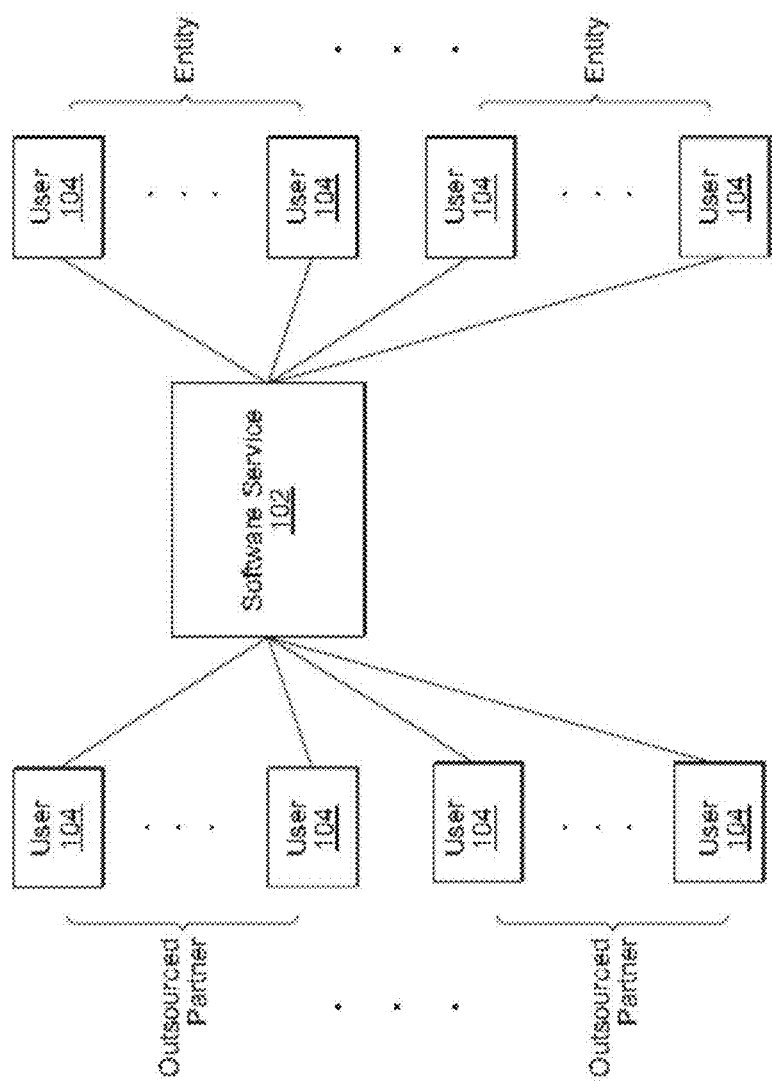
FIG. 1 is a simplified block diagram illustrating an exemplary collaborative business network in accordance with one or more embodiments.

In accordance with one or more embodiments, methods and systems are provided for facilitating business-to-business transactions on a collaborative business network. More specifically, methods and systems are provided for translating and exchanging business-to-business transactions between disparate business systems via a shared collaboration point stored in a globally central directory of businesses. A transaction refers to generally any business agreement and/or status information on business process shared between two parties including, but not limited to, work orders and purchase orders.

A system in accordance with one or more embodiments utilizes a globally central directory of businesses, shared collaboration points between businesses, and transaction translation to enable each company using the system to determine the format of the electronic transactions to be transmitted or received that is native to their business system. Non-limiting examples of transaction formats are SAP IDoc and OAGIS. The business directory stores the formats each business requires for sending and receiving information. The collaborative point represents the business-to-business connection. Irrespective of the formats the transactions were submitted in, the system will then translate the transaction to the form required by the receiving business system. This system reduces the costs, time spent, and on-going maintenance required for business transaction exchanges across a transaction network to a single integration irrespective of how many business partners send or receive transactions to or from the business.

Further embodiments are directed to system integration message routing and identifier mapping utilizing a shared workspace mechanism. Members of a shared collaborative workspace need, for purposes of integration with other members, configuration and addressing information. In accordance with one or more embodiments, a workspace and member centric configuration space is provided, where each member provides routing and identifier knowledge in an independent way and without necessarily knowing how other members have configured their view of the workspace. The system uses this configuration information and combined with the workspace as a locus and individual subscription preferences, routes and maps messages accordingly. This solves the problem where each member otherwise needs to know the specific codes used by each of its partners in order to communicate with them.

Traditional integration systems require each partner to be aware of the requirements of each foreign system endpoint, which must be maintained in routing rules and data mapping tables. In the present system, the mapping is provided relative to the workspace and not the foreign systems, and the routing is maintained as a function of the shared workspace and not discreet mapping rules.

Collaborative Business Network

The techniques for facilitating business-to-business transactions and system integration routing and identifier mapping described herein are implemented in a system for collaborative execution of business processes. A representative system is described in U.S. Patent Application Publication No. 2011/0246340 entitled METHOD AND SYSTEM FOR COLLABORATIVE EXECUTION OF BUSINESS PROCESSES, which is incorporated by reference herein in its entirety. The system enables collaborative execution of business processes across geographically dispersed entities (e.g., businesses, companies, or organizations) and their outsourced business partners (e.g., contract suppliers providing products or services to an entity). By way of example, an entity can be a business that sells products (e.g., life science company that sells pharmaceutical products), and outsourced business partners can be companies that are contracted to supply raw materials, manufacture the products, or package the products.

The collaborative business process execution system provides a single software service, which can be managed by a third party, on one or more publicly available server computers for facilitating the collaborative execution of business processes for multiple entities and their respective outsourced business partners. The software service has common business process rules, a common business information schema or architecture, and a directory of shared workspaces for registered users of all of the entities and outsourced partners. The common business process schema allows a network of users to execute many-to-many processes uniformly across their outsourced partners. Users, who can be geographically dispersed, access the service using client devices communicating with the server computer over a global communications network such as the Internet.

The service enables users to create secure collaboration workspaces accessible by a team of users associated with an entity and their outsourced partners for shared business processes. Each collaboration workspace provides a common operational view of shared business processes to the team of users to facilitate execution of the business processes. Users can build a network of relationships through collaboration workspaces. The workspaces are secure, and only the information shared by a relationship is available to users.

The collaboration workspaces facilitate interaction and sharing of information relating to shared business processes among the team of users. The information can include structured information such as structured business documents associated with a business process including purchase orders, work orders, material orders, forecast information, quality information, inventory disposition, inventory movement information, or product serialization information. The shared information can also include unstructured information such as shared discussions and document files including process instructions, reports, schematics, diagrams, and other documentation shared in support of the structured business processes.

The service connects users to business processes by enabling users to identify and grant access rights to additional users to access the collaboration workspace. Access rights to team members from across each company can be granted to a specific collaborative relationship by other users (e.g., by a user designated as the point-of-contact on either side of the relationship).

The service allows an entity to connect once to its outsourced partner network and can then operate with multiple (potentially thousands of) partners using the collaboration workspaces.

The service can facilitate execution of various types of shared business processes including, but not limited to, production tracking, materials tracking, inventory monitoring, quality review, and production forecasting. These processes can be instrumented, allowing detailed analysis on the process execution across all partners, providing the opportunity to optimize collaborative business processes improving things like cycle times and costs while maintaining the innovation and flexibility of outsourcing. The service can provide statistical analysis on business process performance across all similar business processes. For instance, the service can provide general statistics on percentage of time spent in each phase of production across all production tracking instances. This is an example of advantages provided by having a single, common schema across all entities and suppliers.

Through enhanced business collaboration, the service allows companies to create a predictable supply network, which provides numerous advantages including better performance, quality, and timeliness of external sourcing and supply chain operations.

FIG. 1 is a simplified block diagram illustrating an exemplary collaborative business network. The network includes a server computer system 102, which communicates with a plurality of client devices 104 operated by system users. Each of the users is associated with one of multiple entities and outsourced partners. The client devices 104 are connected via a communications channel to the server computer system 102. The channel may, e.g., be the Internet or other network connection.

The client devices 102 may, e.g., be personal desktop or laptop computers, workstations, portable communication devices such as personal digital assistants (PDA) or smart phones, or any computing device capable of communicating with the server computer system 102. The server computer system 102 can be, e.g., a Web server, and may be implemented in a Cloud solution.

The server computer system 102 provides the software service that allows users to create the collaboration workspaces discussed above, where virtual team members from an entity and outsourced business partners interact and create a common operational view across shared business processes. The workspace connects people, processes, and information between business partners with minimal infrastructure investment.

The collaboration workspaces can be established with generally any hierarchy that suits the entity or its outsourced partners including, e.g., per product, per client, per project, per relationship, or any combination of these. As such, an entity may have a single collaboration workspace or many hundreds.

Collaboration workspaces can be created for the duration of a project (e.g., a clinical trial) then be archived until another project between the parties requires reactivation of the workspace.

A collaboration workspace can be established by a user at an entity or a user at an outsourced partner inviting the other to collaborate. The users (who can be designated as managers) can agree on the scope of the collaboration workspace, i.e., what processes and information exchanges are supported, and invite additional virtual team members to participate in the workspace.

Document sharing and messaging are built into the collaboration workspace environment and are associated and integrated to the business process context. For example, artwork specification documents may be attached to a particular purchase order. Similarly, any notes commenting on the reason for a particular activity can also be linked to the particular activity. In accordance with one or more embodiments, the workspace environment can maintain an audit trail for all changes to processes, documents, and notes.

Business-To-Business Transactions on a Collaborative Business Network

Businesses on the collaborative network are registered with a central directory. In integrating with the network, a business uses a single file transfer connection and a single set of transaction mappings. Using this single integration, businesses on the network can integrate and collaborate with each other.

Each specific business-to-business collaboration context is manifested as a shared collaborative workspace. In addition to standard collaborative features like document sharing, shared discussions, and applications for shared business process execution, the shared workspace is also a hub for business-to-business transactions for that specific collaboration context.

As a business submits transactions to the system, they are received, mapped from the company native format into an internal format, delivered to the workspace where business objects and application data will be updated, and then after consulting the delivery options for the business partner, may be mapped to a format for the partner and delivered to them. The progress and status of the business-to-business transaction path is available within the shared workspace so all participants can know the state of the transaction. If there are errors, the transaction can be re-processed and/or re-sent from the workspace. There is also a company-wide administrative capability that allows a user to monitor and manage transactions across all of the collaborative workspaces on the network.

The system can fully integrate business-to-business transaction processing with a collaborative environment on a per workspace basis. This provides for a single view for both parties of the state of business objects and the transactions that impact them. It also provides for transaction processing and data visibility on a per workspace basis for greater control on a per partnership business context basis.

Process Flow

Figure 5:
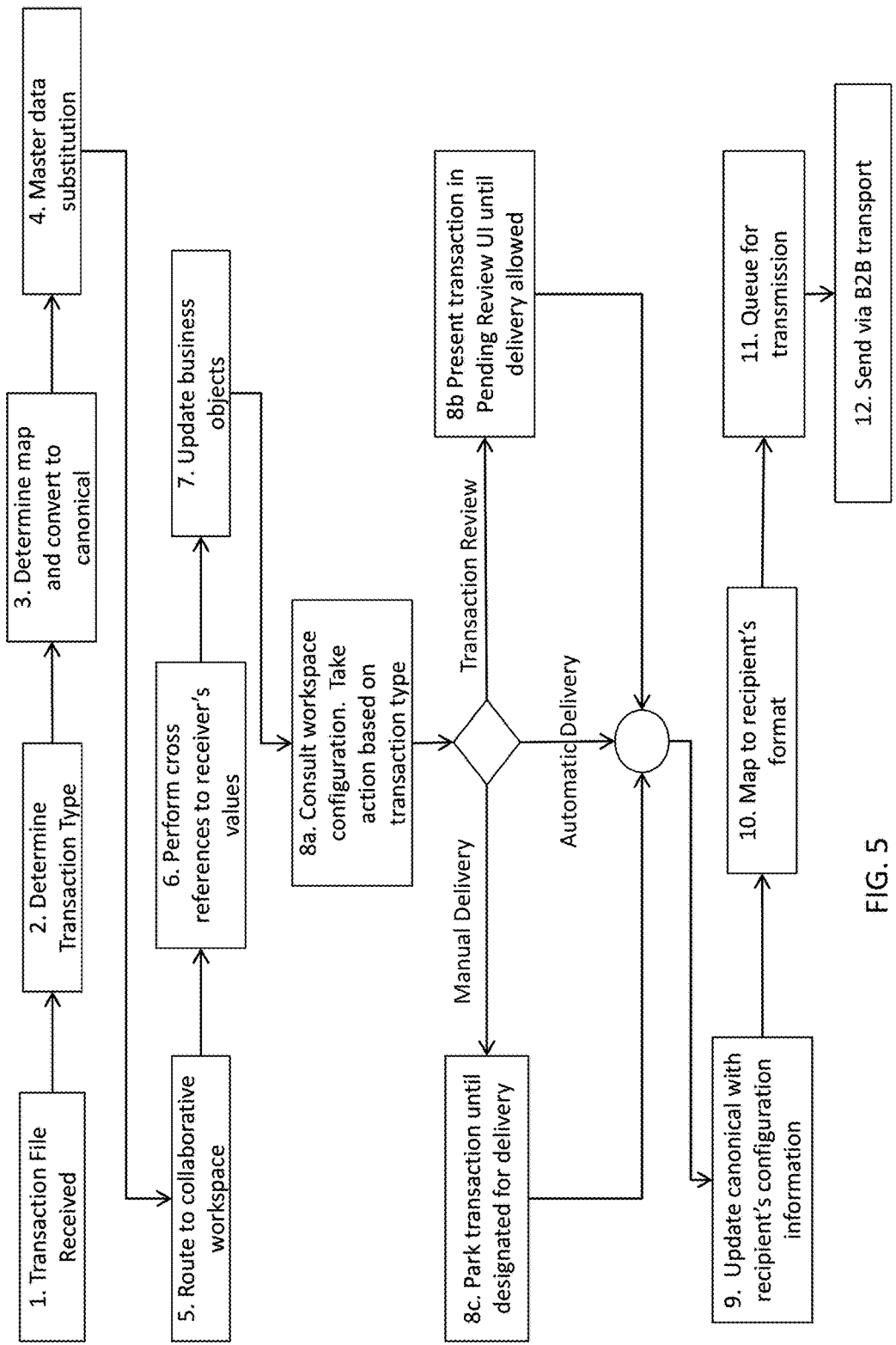
FIG. 5 is a flow chart illustrating transaction processing in accordance with one or more embodiments.

The following is an example of a process flow for handling business-to-business transactions in accordance with one or more embodiments with reference to FIG. 5.

1. A transaction file is initially received by the system from a first business (Partner1) via a B2B transport (e.g., AS2, FTP, MQ).
2. The file's header information is checked to determine the transaction type.
3. Based on who the sender was, the transaction type, and the direction (inbound), the file is mapped from Partner1's format into the system's canonical form. A canonical form is a standardized internal representation of a transaction.

It provides rich semantics to programmatically operate on the transaction, performs semantically driven validations on the transaction, facilitates the transformation from one partner format to another, and populates application objects.

Figure 6:
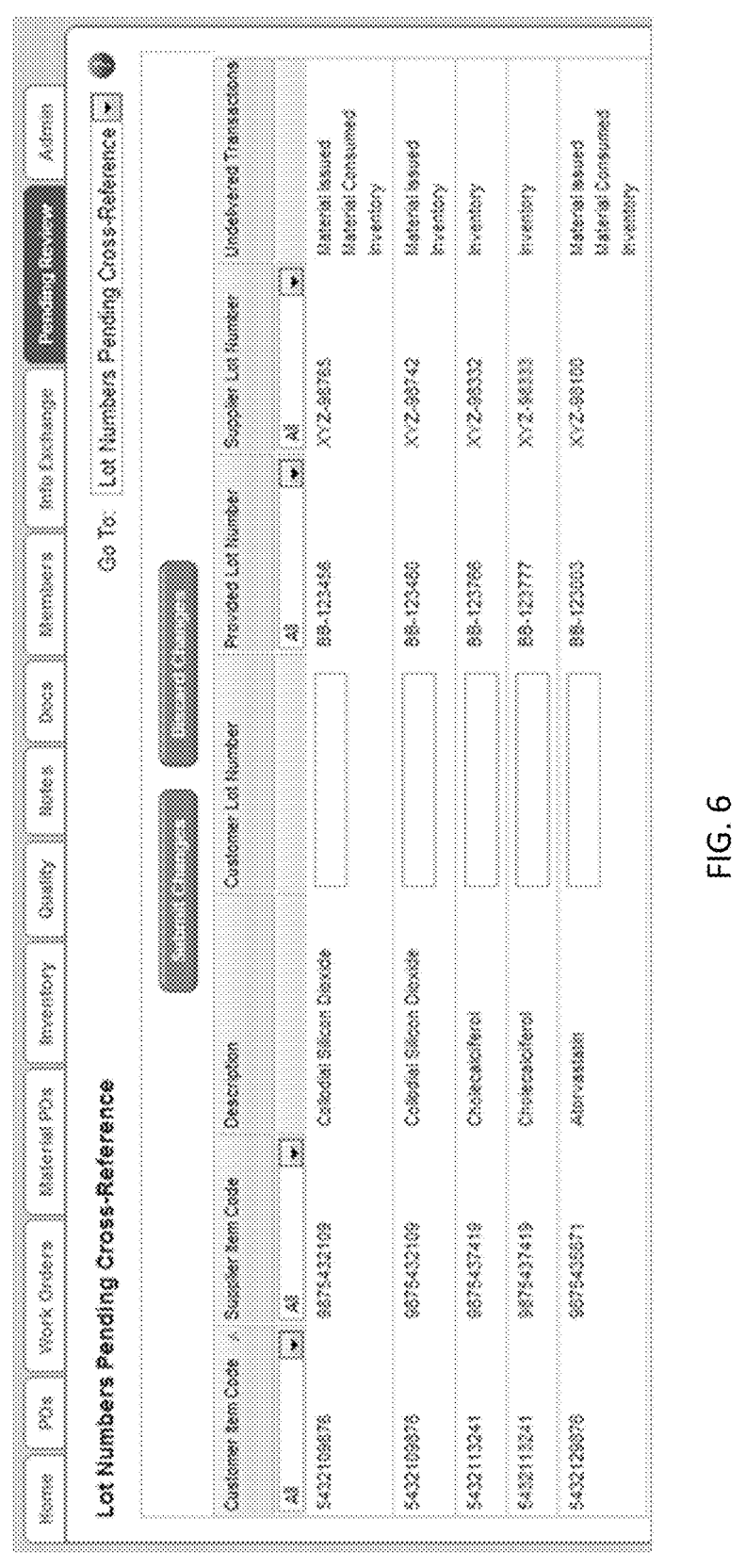
Figure 8:
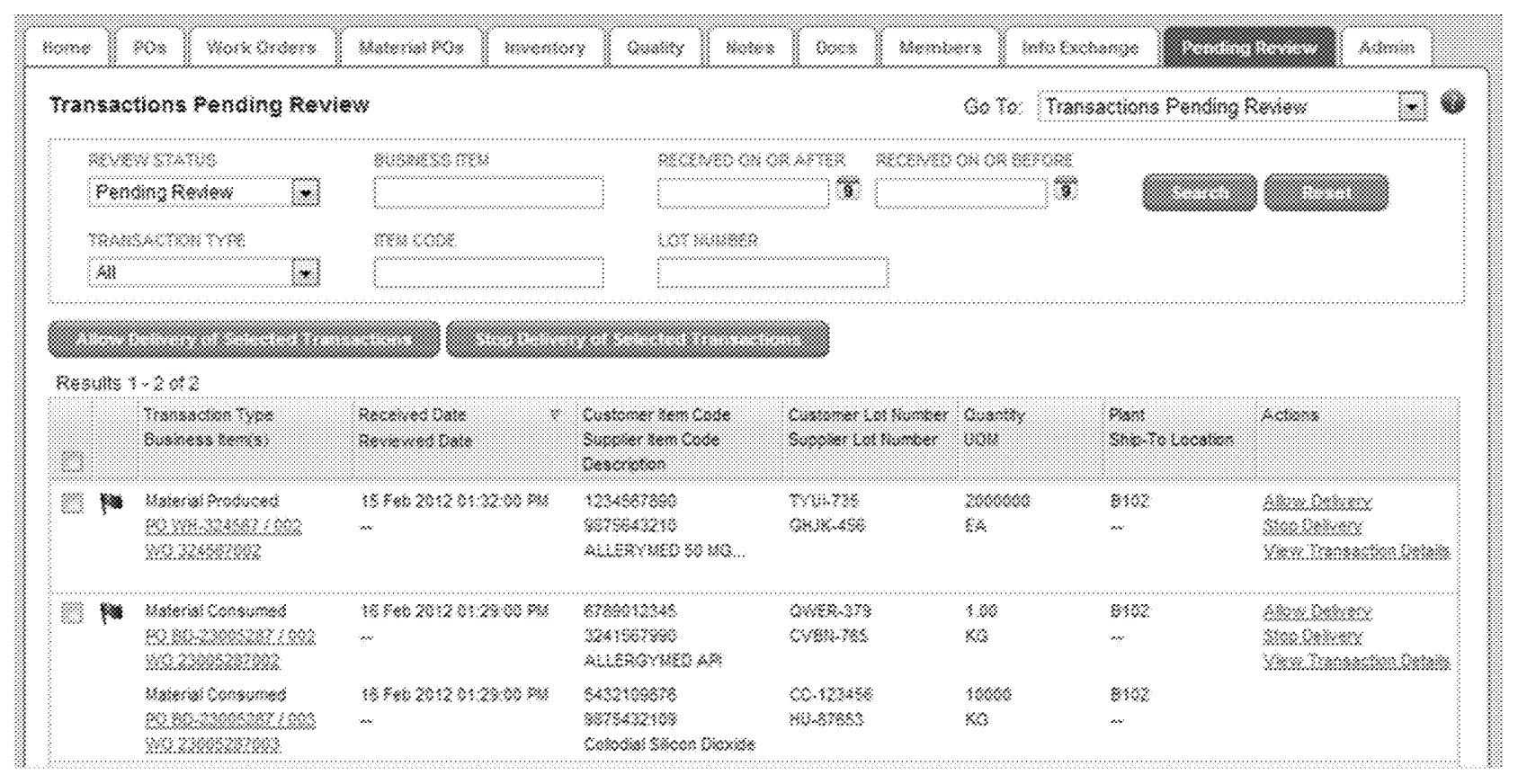

4. Data fields in the file requiring master data cross reference are looked up and substituted in the canonical form (described in further detail below).
5. The file is routed to the collaborative workspace shared by Partner1 and Partner2 using mapped information from the canonical form.
6. Data fields requiring cross reference for the business to whom the transaction is directed (Partner2) are substituted in the canonical form. Fields requiring cross reference but not having a cross reference value are flagged for exception processing in the user experience (see, e.g., FIG. 6). Cross references must be resolved before proceeding to the next step.
7. The system updates the related business objects in the collaborative workspace based on the canonical form.
8. The workspace configuration for the business to whom the transaction is directed (Partner2) is checked to determine the next set actions to take based on the transaction type (see, e.g., FIG. 7). If the transaction type is configured for pending review or manual delivery, the file is parked in a portion of a workspace called the "InfoExchange" (as shown, e.g., in FIG. 2) until such a time as either a business user reviews and allows delivery (for the pending review case using the Transaction Review user interface (see, e.g., FIG. 8)) or an administrator designates the file to be delivered (in the manual delivery case).
9. Once a file is designated for delivery (either via automatic delivery, after pending review, or via manual delivery) the file is updated with configuration information from Partner2's "ProcessLink" (collaborative workspace) configuration.
10. The updated canonical form is mapped from the canonical form into Partner2's backend format.
11. The file is then enqueued to be sent out via the transport mechanism specified by Partner2.
12. The file is sent via the B2B transport specified by Partner2.

Master data cross reference is a capability of the system to populate information in the transaction from an identifier and/or convert data elements from one company's identifier(s) to another. One example of this is using a product code to look up information about the product and populate the transaction with that product information. For instance, if the transaction specifies a product identifier (xyz), a look up is performed for information about that product code and used to populate in the canonical the fields for Drug Name, Manufacturer, Dosage Form, Strength, and Container size. As another example, company A refers to product P using ID 123, while Company B uses ID 789 for the same product. If the transaction is going from company A to company B, then it will come to the system as 123 but will need to go to B as 789 for company B's system to be able to process it.

Transaction review is a capability by which a company can review the information sent into the system by a partner of theirs before allowing it to proceed into their system. In the transaction processing system, on a per workspace, per transaction type basis, a company can designate transactions to require review. When a transaction requiring review is received, it is parked in the application awaiting user inspection via the user interface. If the user approves the transaction, then the transaction continues processing on its way through the transaction processing system and on to the approver's system.

The InfoExchange shows the state of the transaction in total within the workspace, as well as the individual files that comprise the transaction and the ability to operate on them. In most cases, it is one in and one out, but with error conditions or re-processing, the number could be higher (one for each error correction and/or reprocess). The InfoExchange is visible to users within the workspace. A company-wide InfoExchange allows administrators to view and act upon all files system-wide and/or on a per workspace basis.

Figure 2:
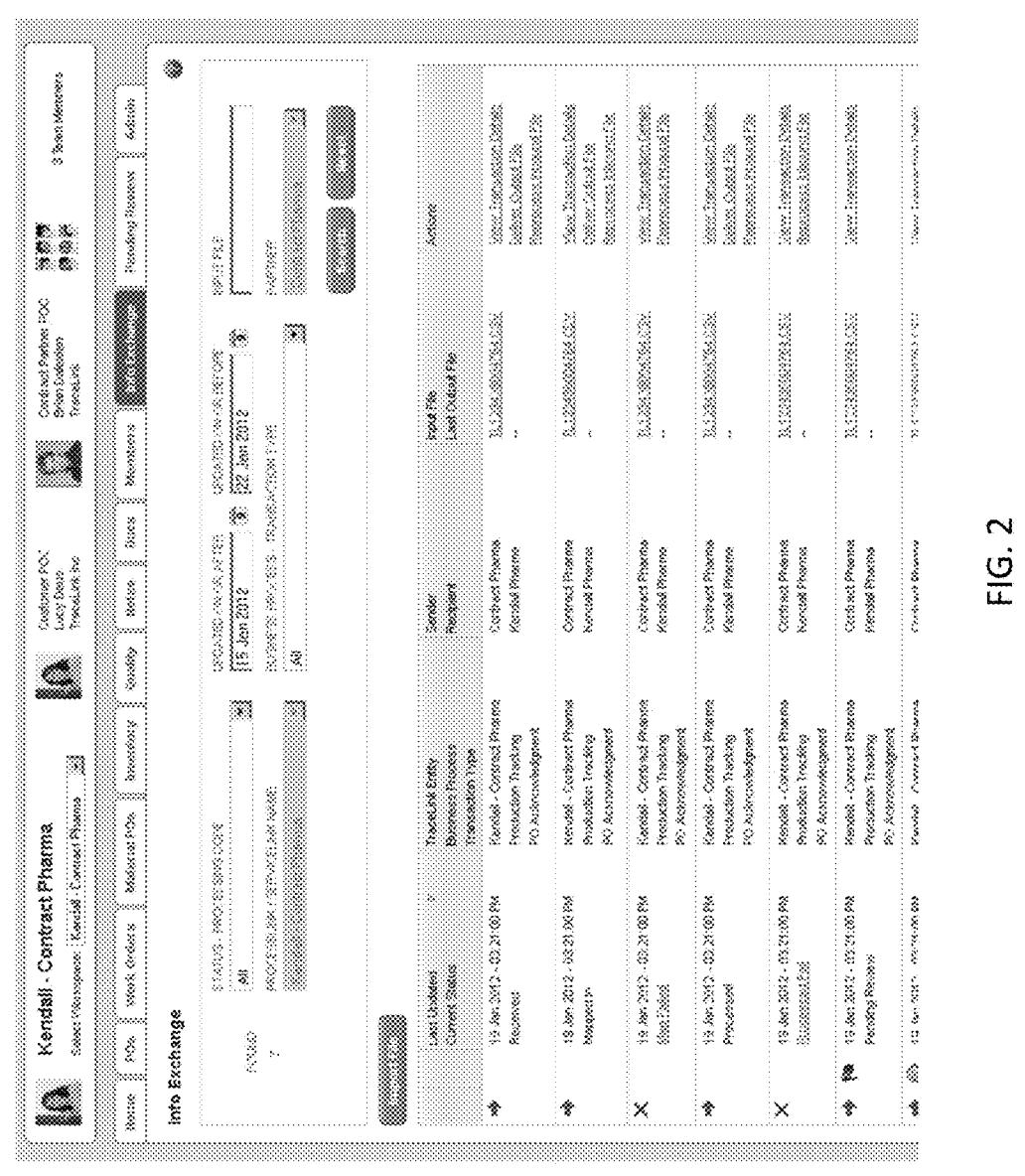

FIG. 2 illustrates an exemplary InfoExchange screen, which shows the files that comprise transactions with a workspace. In this example, the workspace is called "Kendall—Contract Pharma" and is shared by two companies. As files come in and are processed, their status is available here. Also, actions may be taken from this screen with the transactions. For example, if a file could not be delivered for some reason, it could be signaled to be re-delivered.

These transactions are scoped to the workspace, and affect business objects (e.g., Purchase Orders, Inventory reports) for this workspace only. The access control is also limited to designated members of the workspace.

Figure 3:
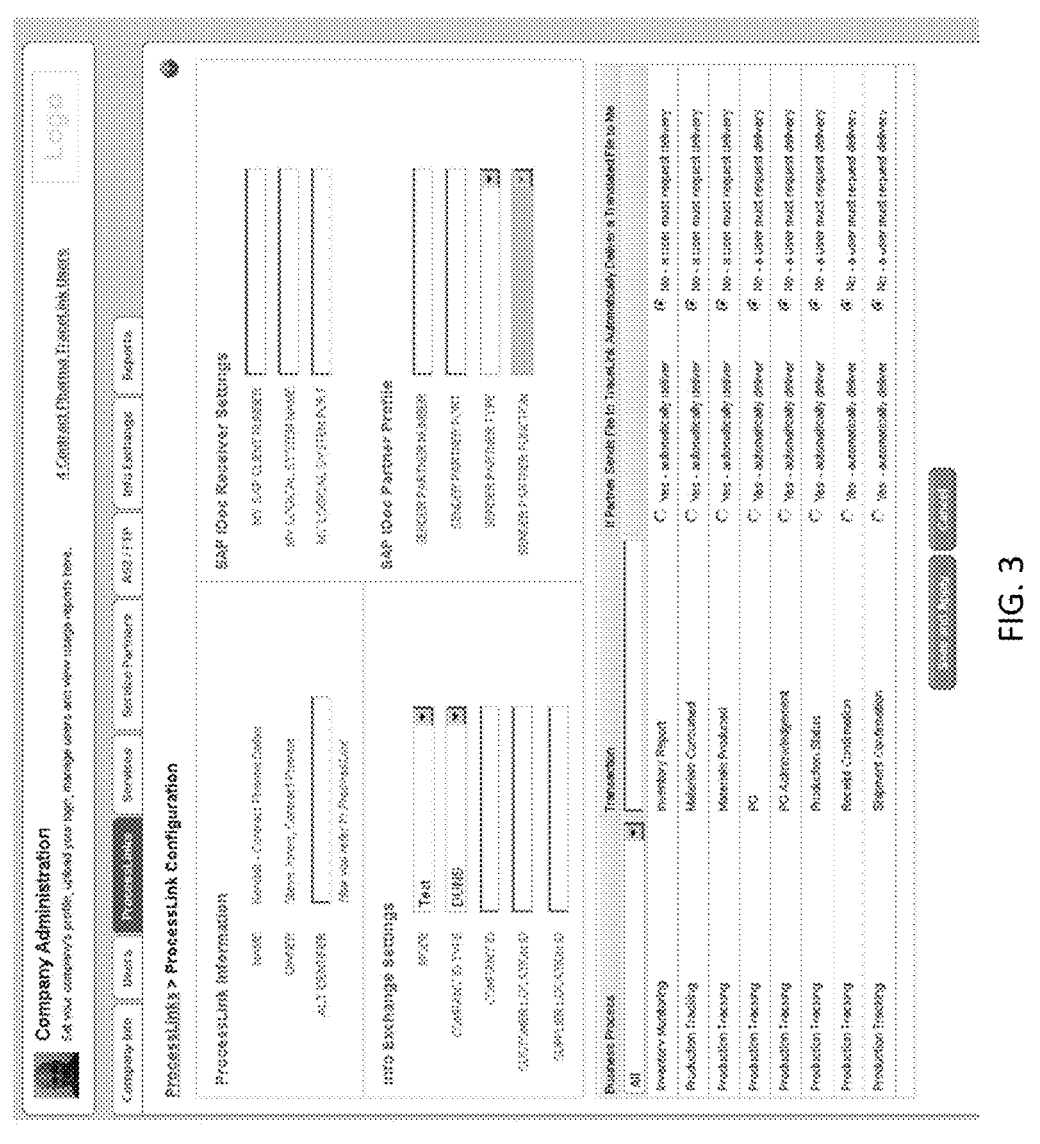

FIG. 3 is a screenshot showing an exemplary ProcessLink collaborative workspace configuration. Every ProcessLink has a set of configuration parameters to govern the treatment of files and transactions in the workspace.

There are general parameters for all transactions that flow through the workspace. One is the mode (test or production)—this flag will be set in files that are destined to a business's backend system to tell it how it should treat the files. Businesses also can set IDs to indicate how they refer to themselves, and how they refer to their partners. Additionally, enterprise resource planning (ERP) specific settings to facilitate processing by the receiving system are set here as well (e.g., parameters for the control segment of SAP IDocs).

Then, for each transaction type, the business specifies behavior that should happen when a file of that type enters the workspace. The options are automatically deliver, do not deliver, and user review and allow delivery.

Automatically deliver—As the file enters the workspace, it is processed, enhanced with the business's configuration parameters and sent to the business's backend system automatically.

Do not deliver—The file enters the workspace but proceeds no further without explicit action from a user (usually an administrator).

User review and allow delivery—the file is in a review state with a special interface to view it and then explicitly allow it or disallow it to proceed to the business's backend system.

Figure 4:
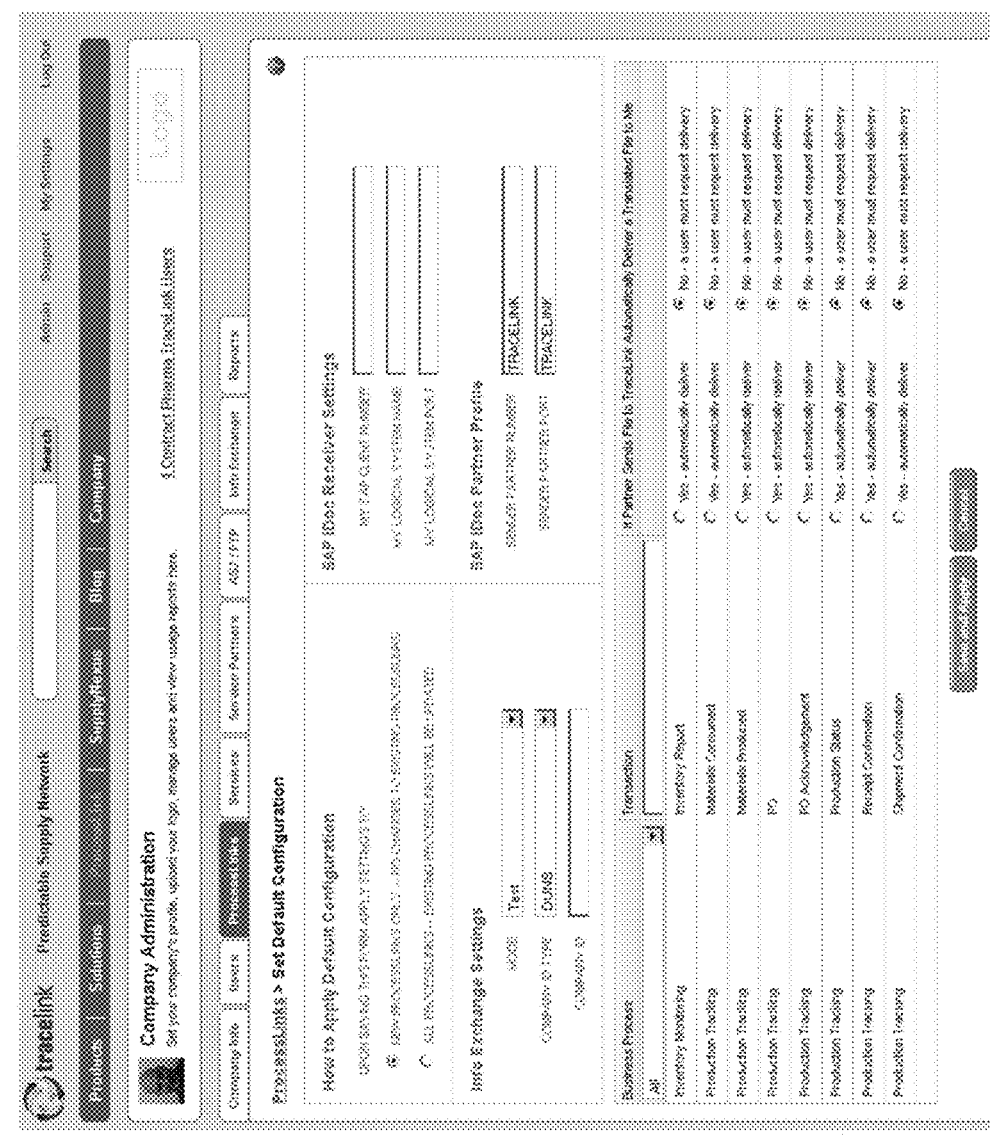

FIG. 4 illustrates an exemplary ProcessLink Default Configuration screen. This is an administrative screen that allows an administrator to specify the default behavior for all collaborative workspaces with respect to file and transaction processing.

A significant advantage of the transaction processing methods and systems disclosed herein is that once an entity integrates to the collaborative network (such that the system can convert to and from its formats into the canonical form), and another entity integrates to the network, then the two entities can communicate with each other through the system without any incremental work.

The workspace configuration feature allows a receiving entity to control how messages are handled by their system (s) without any involvement or impact to the sending entity. In conventional systems, the sending entity would be required to have some knowledge of the receiver's system configuration parameters and would be susceptible to needing to modify their sending procedure to accommodate changes on the receiving side. Alternatively, the receiver would need the sender to modify its messages to accommodate something like sending to a test system. In the methods and systems disclosed herein, both sides can evolve independently, with each side owning their own configuration.

System Integration Message Routing And Identifier Mapping

Traditional systems integration is based on a hub and spoke metaphor, where the spokes are the systems to be integrated and the hub acts as a message translator and router. Messages may be translated both incoming and outgoing, and a rules system typically controls where the messages go. These rules are often based on both the content of the message (e.g., information in fields) and empirical rules (e.g., send me this when . . . ). Translation tables and routing rules must be maintained for each endpoint, even when utilizing a canonical format, since identifiers and other opaque values are difficult to express in a standardized way.

A shared workspace provides additional information in the form of a locus for the messages and endpoints. Using this knowledge, the system configures and stores integration addressing and routing information relative to each participant and the workspace. This simplifies the configuration and reduces cross-participant knowledge.

In a traditional integration system, Participant A ("PA") must know and provide to the system how its data will map and address to Participant B ("PB"). Additionally, when new participants join, each of their identifiers must be known and mapped by PA. In the present system, each participant works relative to the shared workspace, which provides a boundary for identifiers and the mapping space. PA must know how to address the shared workspace, but not each member within the space. Conversely, PA must also map in the reverse direction, providing the shared workspace a known way of addressing PA when sending messages. Each participant then provides like information, both in and out of the shared workspace, but always relative to his or her relationship with the workspace. Because the information is relative to the workspace, no knowledge of other participant's mapping is required. The shared workspace then acts as if a hub-and-spoke message router, transmitting the messages based on subscription configurations.

Consider the following example: PA is sending a Purchase Order (PO) to members of a workspace. The addressing information for the PO is set to that of the workspace by PA. The system accepts the incoming PO and uses this address to identify the correct workspace. The workspace configuration context contains the delivery preferences for each of the workspace participants. The system uses these delivery preferences to determine whom to send the PO to. Each recipient has an outbound address map specific to the workspace where the delivery address is mapped from the workspace to whatever internal form is needed by the recipient. Addressing is always workspace-centric, not sender centric.

Process Flow

Referring to the process flow described above with respect to business-to-business transactions, when a file is received and mapped by the system, its collaborative workspace must be identified. It is identified using information provided in the file. A workspace has two identifiers—one for Partner1 and another for Partner2. This enables both sides to reference the workspace with information they have—eliminating the need to have knowledge from the partner.

Thus, when a document is sent to a workspace, it is referenced using an identifier that is completely within the knowledge of the sending partner (Partner1), without any requirements on the other partner (Partner2).

When a file needs to be sent to the other partner (Partner2), the information populating the file is completely known to, and set by Partner2. This information is populated into the file before sending it to Partner2's system.

The processes described above may be implemented in software, hardware, firmware, or any combination thereof. The processes are preferably implemented in one or more computer programs executing on a programmable computer (which can be part of the server computer system) including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer server system may comprise one or more physical machines, or virtual machines running on one or more physical machines. In addition, the computer server system may comprise a cluster of computers or numerous distributed computers that are connected by the Internet or another network.

Accordingly, the foregoing description and attached drawings are by way of example only, and are not intended to be limiting.

What is claimed is:

1. A computer-implemented method for facilitating business-to-business transactions on a collaborative business network among a plurality of entities, the method comprising:

maintaining, at a server communicating with each of the plurality of entities, a collaborative network comprising a multiplicity of different collaborative workspaces each associated with a different collaborative project involving a selection of ones of the entities, and a directory specifying a corresponding file formats for transactions comprising documents received from and to be sent to each of said entities in a business process shared with another one or more of said entities with respect to a specific one of the collaborative workspaces;

receiving from a computing device associated with a first one of the entities, at the server, a transaction comprising a document from a the first one of said entities directed to a second one of said entities, the document including a specification of a particular one of the collaborative workspaces, said transaction having a first file format associated with said first entity;

translating, at the server, the received transaction from the file format associated with the first entity to convert the received transaction from the first file format into a canonical file format representing a standardized representation of the transaction for the first and second entities in connection with the particular one of the collaborative workspaces;

routing, at the server, the transaction in the canonical file format to the particular one of the collaborative workspaces shared by the first and second entities and specified by the document by retrieving from the document the specification of the particular one of the collaborative workspaces and automatically without manual intervention routing the transaction to the particular one of the collaborative workspaces as specified in the retrieved specification;

translating, at the server, the transaction represented in the canonical file format to a second file format for the transaction specified in the directory for files to be sent to the second entity; and transmitting, from the particular one of the collaborative workspaces in the server to a computing device associated with the second entity, the transaction in the second file format specified in the directory for files to be sent to the second entity.

2. The method of claim 1, wherein the transaction from the first entity is received via a B2B transport, and the transaction to the second entity is transmitted via a B2B transport.

3. The method of claim 1, further comprising performing a master data cross reference lookup to convert one or more data elements in the transaction in the canonical file format from specifying an identifier of the first entity to a corresponding identifier of the second entity.

4. The method of claim 3, wherein the one or more data elements comprises product codes.

5. The method of claim 1, further comprising performing a master data cross reference lookup to identify additional information on a data element in the transaction received from the first entity, and to populate one or more fields in the transaction in the canonical file format with the additional information.

6. The method of claim 1, further comprising updating related business objects in the particular one of the collaborative workspaces using the transaction in the canonical file format.

7. The method of claim 1, further comprising, after translating the transaction in the canonical file format, analyzing a workspace configuration in the particular one of the collaborative workspaces for the second entity to determine an action to be taken based on a type of the transaction.

8. The method of claim 7, wherein the action comprises parking the transaction in the workspace until the second entity allows delivery.

9. The method of claim 1, further comprising, after transmitting the transaction in the canonical file format, updating the transaction in the canonical file format with configuration information for the second entity.

10. The method of claim 1, further comprising receiving configuration information from each of said entities specifying how messages or transactions are handled by their respective systems.

11. A computer system for facilitating business-to-business transactions on a collaborative business network among a plurality of entities, comprising:
   at least one processor;
   memory associated with the at least one processor; and
   a program supported in the memory, the program having a plurality of instructions stored therein which, when executed by the at least one processor, cause the at least one processor to:
   maintain a collaborative network comprising a multiplicity of different collaborative workspaces each associated with a different collaborative project involving a selection of ones of the entities, and a directory specifying corresponding file formats for transactions comprising documents received from and to be sent to each of said entities in a business process shared with another one or more of said entities with respect to a specific one of the collaborative workspaces;
   receive, from a computing device associated with a first one of the entities, a transaction comprising a document from a the first one of said entities directed to a second one of said entities, the document including a specification of a particular one of the collaborative workspaces, said transaction having a first file format associated with said first entity;
   translate the received transaction from the file format associated with the first entity to convert the received transaction from the first file format into a canonical file format representing a standardized representation of the transaction for the first and second entities in connection with the particular one of the collaborative workspaces;
   route the transaction in the canonical file format to the particular one of the collaborative workspaces executing on the computer system and shared by the first and second entities and specified by the document by retrieving from the document the specification of the particular one of the collaborative workspaces and automatically without manual intervention routing the transaction to the particular one of the collaborative workspaces as specified in the retrieved specification;
   translate the transaction represented in the canonical file format to a second file format for the transaction specified in the directory for files to be sent to the second entity; and
   transmit from the particular one of the collaborative workspaces, to a computing device associated with the second entity, the transaction in a second file format specified in the directory for files to be sent to the second entity.

12. The computer system of claim 11, wherein the transaction from the first entity is received via a B2B transport, and the transaction to the second entity is transmitted via a B2B transport.

13. The computer system of claim 11, further comprising instructions for causing the processor to perform a master data cross reference lookup to convert one or more data elements in the transaction in the canonical file format from specifying an identifier of the first entity to a corresponding identifier of the second entity.

14. The computer system of claim 13, wherein the one or more data elements comprises product codes.

15. The computer system of claim 11, further comprising instructions for causing the processor to perform a master data cross reference lookup to identify additional information on a data element in the transaction received from the first entity, and to populate one or more fields in the transaction in the canonical file format with the additional information.

16. The computer system of claim 11, further comprising instructions for causing the processor to update related business objects in the particular one of the collaborative workspaces using the transaction in the canonical file format.

17. The computer system of claim 11, further comprising instructions for causing the processor to, after translating the transaction in the canonical file format, analyze a workspace configuration in the particular one of the collaborative workspaces for the second entity to determine an action to be taken based on a type of the transaction.

18. The computer system of claim 17, wherein the action comprises parking the transaction in the workspace until the second entity allows delivery.

19. The computer system of claim 11, further comprising instructions for causing the processor to, after transmitting the transaction in the canonical file format, update the transaction in the canonical file format with configuration information for the second entity.

20. The computer system of claim 11, further comprising instructions for causing the processor to receive configuration information from each of said entities specifying how messages or transactions are handled by their respective systems.

* * * * *